United States Patent [19]

Koren et al.

[11] Patent Number: 5,127,081
[45] Date of Patent: Jun. 30, 1992

[54] OPTICAL BRANCHING WAVEGUIDE

[75] Inventors: Uziel Koren, Fair Haven; Kang-Yih Liou, Holmdel, both of N.J.

[73] Assignee: AT&T Bell Laboratories, Murray Hill, N.J.

[21] Appl. No.: 563,162

[22] Filed: Aug. 3, 1990

[51] Int. Cl.⁵ .......................... G02B 6/30; H04B 9/00
[52] U.S. Cl. ...................................... 385/130; 385/14
[58] Field of Search .......................... 350/96.11–96.15

[56] References Cited

U.S. PATENT DOCUMENTS

| | | | |
|---|---|---|---|
| 4,674,827 | 6/1987 | Izutsu et al. | 350/96.12 |
| 4,760,569 | 7/1988 | Mahlein | 350/96.11 X |
| 4,846,540 | 7/1989 | Kapon | 350/96.12 |
| 4,878,727 | 11/1878 | Boiarski et al. | 350/96.11 X |

OTHER PUBLICATIONS

Koren et al., "Semi-Insulating Blocked Planar . . . ", Electronic Letters, Feb. 4, 1988, vol. 24, No. 3, pp. 138–139.
Sasaki et al., "Normalised Power Transmission In Single Mode . . . ", Electronics Letters, Feb. 5, 1981, vol. 17, No. 3, pp. 136–138.
Burns et al., "Mode Conversion in Planar-Dielectric Separating Waveguides", IEEE Journal of Quantum Electronics, vol. QE-11, No. 1, Jan. 1975, pp. 32–39.
Liou et al., "Monolithic Integrated InGaAsP/InP . . . ", Appl. Phys. Lett. 54(2), Jan. 9, 1989, pp. 114–116.

Primary Examiner—Akm E. Ullah
Attorney, Agent, or Firm—S. H. Dworetsky; E. Weiss

[57] ABSTRACT

An optical branching waveguide having low radiative loss and low back-reflectivity is described. By employing between the branches a region having a gradual decrease in effective refractive index along the direction of optical propagation, the deleterious effect of wedge tip truncation can be reduced. According to the teachings of the invention, this may be accomplished by gradually decreasing the thickness of the optical material along the axis of optical propagation and planarizing the region with an optical material having a lower refractive index than the underlying optical material.

29 Claims, 8 Drawing Sheets

OPTICAL BRANCHING WAVEGUIDE

TECHNICAL FIELD

The present invention relates to optical branching waveguides and, in particular, to integrated Y-junction waveguides for controlling the power dividing ratio.

CROSS-REFERENCE TO RELATED APPLICATION

This application is related to U.S. patent application Ser. No. 07/563,164(Koren-Liou 12-4), which was filed concurrently herewith.

BACKGROUND OF THE INVENTION

Monolithic integration of optical components on a III-V semiconductor is emerging as an important field known as photonic integrated circuits (PICs). In particular, photonic integrated circuits consist of active and passive optical components fabricated on a single III-V semiconductor substrate. In addition to the realization of new functional devices, such as modulators, switches, splitters, lasers, and detectors, photonic integrated circuits simplify device packaging and testing.

Recently, the inventors have demonstrated the material compatibility of the fundamental building blocks for PICs by monolithically integrating on a single chip a distributed feedback (DFB) laser, passive Y-junction waveguide, and p-i-n photodiode. See K. Y. Liou et al., *Appl. Phys. Lett.*, Vol. 54, No. 2 pp. 114-6 (1989). In the above device by Liou et al., as well as in most PICs, the Y-junction waveguide, which interconnects active devices by dividing an incident optical signal into two output branches, is an indispensable waveguide component. As such, it is not surprising that various Y-junction designs have been fabricated on various substrates, such as glass, lithium niobate and gallium arsenide (GaAs). See, for example, U.S. Pat. Nos. 4,674,827, 4,846,540, and 4,850,666.

Although prior art Y-junction waveguides perform acceptably, due to limitations of fabrication techniques, practical Y-junction or branching waveguides deviate from their ideal designs, which in turn, has deleterious effects on optical devices connected thereto. For example, the wedge tip of a Y-junction waveguide typically becomes blunt, that is truncated, when processed by wet chemical etching techniques because of undercutting. Importantly, this truncation of the wedge tip at the Y-junction results in a substantial amount of optical back-reflection as well as radiative loss. See, for example, Sasaki et al., *Electronics Letters*, Vol. 17 No. 3 pp. 136-8(1989). Low back-reflection and low-loss characteristics of a Y-junction waveguide are particularly attractive for monolithically integrated active optical devices because their performance is highly dependent on the loss and reflectivity properties of the Y-junction. For example, distributed feedback (DFB) and distributed bragg reflector (DBR) lasers typically require optical isolation of better than 50 dB for stable single frequency oscillation. Further, for traveling-wave semiconductor laser amplifiers, optical isolation should be more than 40 dB in order to suppress ripples in the gain spectrum due to residual Fabry-Perot resonances. However, prior to the present invention, there have been no Y-junction or branching waveguides designed to minimize the effect of wedge tip truncation.

SUMMARY OF THE INVENTION

A branching junction waveguide exhibiting low radiative loss and low back-reflectivity is realized by employing between the branches of the waveguide a junction region having a gradual decrease in the effective refractive index along the direction of optical propagation. In particular, this approach minimizes the effect of wedge tip truncation seen for an incident optical radiation by reducing the difference in the effective refractive indices at the optical interface of the truncated wedge tip, that is, the optical region between the waveguiding region (core) and the surrounding region between the branches thereof.

In one embodiment, a Y-junction waveguide comprising an InGaAsP straight branch waveguide and an InGaAsP side branch waveguide intersecting at an angle $\theta$ is fabricated on an InP substrate. Importantly, a gradual decrease in the effective refractive index in the junction region between the branches is achieved by decreasing the thickness of an InGaAsP region located between the branches such as to reduce the effect of the wedge tip truncation.

In another embodiment, a Y-junction waveguide having the above characteristic index profile in the region between the branches is monolithically integrated with an optical amplifier.

Advantageously, the low back-refectivity from the Y-junction can be used to integrate optical devices requiring high optical isolation for realizing high performance photonic integrated circuits.

BRIEF DESCRIPTION OF THE DRAWING

A more complete understanding of the invention may be obtained by reading the following description in conjunction with the appended drawing in which.

DETAILED DESCRIPTION

A Y-junction waveguide exhibiting low radiative loss and low back-reflectivity is realized by employing between the branches of the Y-junction a region having a gradual decrease in the effective refractive index along the direction of optical propagation. Specifically, this approach minimizes the effect of wedge tip truncation seen by an incident optical radiation by reducing the difference in the effective refractive indices at the optical interface of the truncated wedge tip, that is between the waveguiding region (core region) and the surrounding region thereof (cladding region). It should be noted that the effective refractive index between the branches specifically varies from the core index to the cladding index. Advantageously, the low-reflectivity from the Y-junction allows active devices that require high optical isolation, such as optical amplifiers, lasers and the like, to be monolithically integrated with a monitoring detector without having the deleterious effect typically observed in the prior art.

Figure 1:
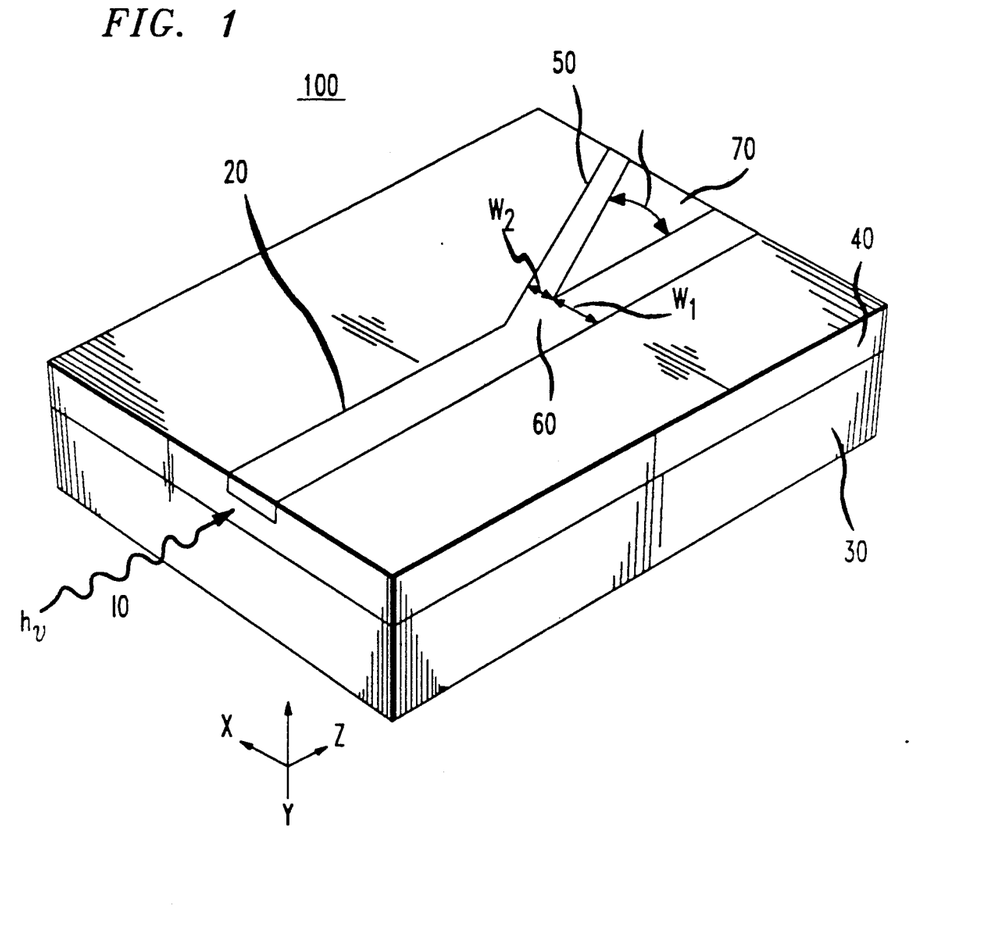
FIG. 1 shows a perspective view of an optical branching waveguide in accordance with the present invention.

Turning to FIG. 1, there is shown a perspective view of an optical Y-junction waveguide 100 for dividing an optical radiation 10 incident on straight branch waveguide 20 into two branches in accordance with the principles of the invention. Y-junction waveguide 100 shown in FIG. 1, however, is meant to be for illustrative purposes only. Equivalent Y-junction waveguides which have the desired low-reflectivity of the present Y-junction waveguide may be realized, for example, with a plurality of either input or output branching waveguides as disclosed U.S. Pat. Nos. 4,850,666 and 4,846,540, which are incorporated herein by reference. Alternatively stated, similar configurations may also be realized in order to divide an incident optical radiation into more than two branches from more than one optical input waveguide. It is anticipated that while the embodiments below are directed to an asymmetric waveguide with a power dividing ratio that is polarization independent, other Y-junction waveguides may be designed, which may be either asymmetric or symmetric as well as polarization dependent.

Y-junction waveguide 100 is fabricated on substrate 30 on which a layer 40 of optical material has been formed by deposition or regrowth techniques. In general, in order to fabricate Y-junction waveguide 100, it is necessary for the effective refractive index $n_{clad}$ of the material surrounding the waveguiding regions (cladding region) to be less than the effective index $n_{core}$ of the waveguiding regions (core region) such that the structure can guide optical radiation of the appropriate wavelength by means of total internal reflection.

In the present Y-junction waveguide, the semiconductor layers are selected from III–V semiconductor materials. Other semiconductor materials, however, may be utilized which have appropriate refractive indices. Additionally, standard fabrication techniques such as metal-organic chemical vapor deposition (MOCVD) and regrowth, wet chemical etching and photolithography are employed to fabricate Y-junction waveguide 100. These fabrication techniques are well-known to those persons of ordinary skill in the art and, thus, are not discussed in detail here.

With reference to FIG. 1, Y-junction waveguide 100 comprises straight branch waveguide 20 and side branch waveguide 50 at an angle $\theta$ with straight branch waveguide 20. The power splitting ratio is controlled by the angle $\theta$ and the widths $W_1$ and $W_2$ of straight branch waveguide 20 and side branch waveguide 50, respectively, near the vicinity of Y-junction area 60. Typically, the width $W_2$ is narrower than the width $W_1$ for higher optical power propagating to straight branch waveguide 20 than side branch waveguide 50, whereas $\theta$ is a few degrees because of fabrication limitations and chosen in accordance with the desired power division and bending loss considerations. It should be noted that small branching angles require long side and straight branch waveguides in order to couple individual fibers to their respective output, which can increase the total length of the Y-junction waveguide.

Figure 2:
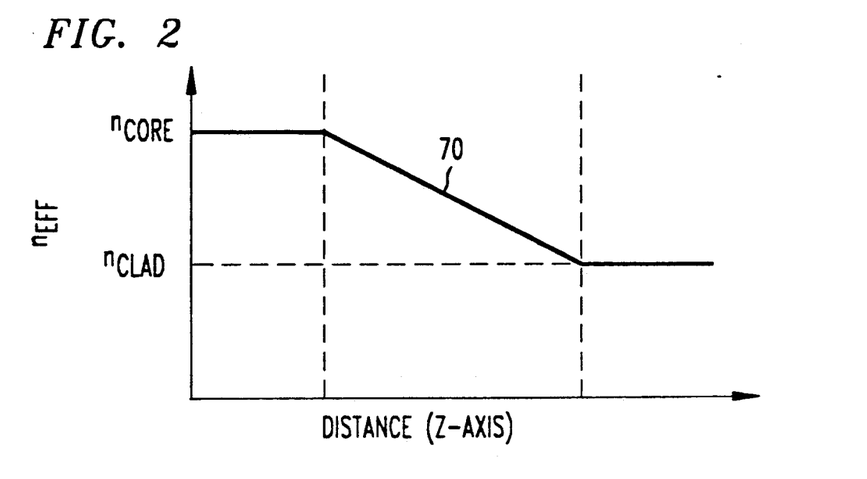
FIG. 2 shows an exemplary effective refractive index profile along the Z-axis for the junction region between the branches of the waveguide shown in FIG. 1.

Importantly, a gradual change in the effective refractive index along the Z-axis in junction region 70 between side branch 50 and the output portion of straight branch waveguide 20 is employed to reduce the effect of the truncation seen by optical radiation 10. Shown in FIG. 2 is an exemplary effective refractive index ($n_{eff}$) profile in junction region 70 along the Z-axis. While the index profile is shown to have a linear gradient, it is contemplated that other gradient profiles may be employed, such as a parabolic, exponential or step function. In a first preferred embodiment of the present invention, both straight branch waveguide 20 and side branch waveguide 50 are single mode waveguides.

Figure 3:
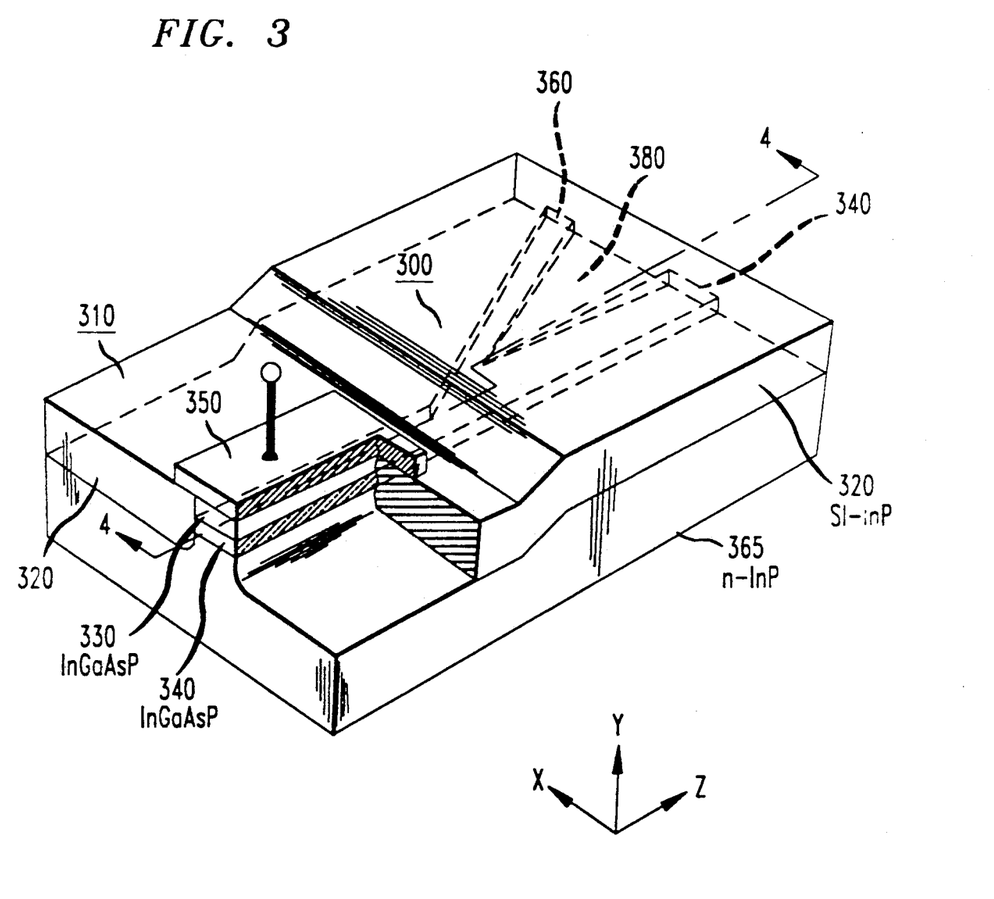
FIG. 3 shows a perspective view of an asymmetric Y-junction waveguide in accordance with the principles of the invention integrated with an optical amplifier.

Shown in FIG. 3 is a passive Y-junction waveguide 300 in accordance with present invention integrated with an optical amplifier 310 having a gain peak wavelength near 1.55 $\mu$m. Optical radiation which impinges on the front facet of optical amplifier 310 is amplified by active InGaAsP layer 330 (bandgap wavelength of 1.55 $\mu$m). Moreover, the confined optical radiation is then coupled to adjacent InGaAsP passive straight branch waveguide 340 (bandgap wavelength of 1.3 $\mu$m), extending from the active section of the optical amplifier to the passive section of Y-junction waveguide 300, as illustrated in the cross sectional view of FIG. 4. It should be noted that the location of the buried waveguides, that is straight branch waveguide 340 and side branch waveguide 360, are shown projected on the top surface by dotted lines. In this exemplary structure, Y-junction waveguide 300 comprises tapered side branch waveguide 360 at a 3.5° angle from straight branch waveguide 340. Additionally, both side branch waveguide 360 and straight branch waveguide 340 are passive InGaAsP waveguide mesas buried by semi-insulating InP 320.

Figure 4:
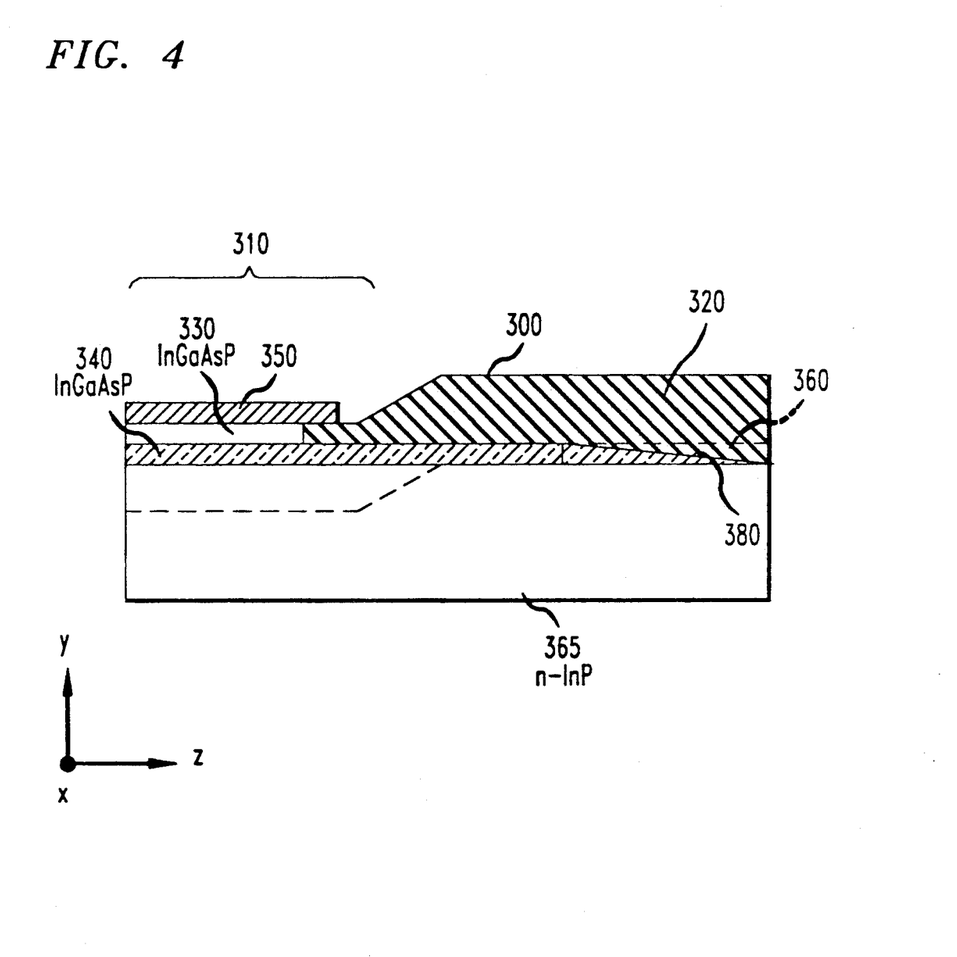
FIG. 4 shows a longitudinal cross section of the integrated optical amplifier and Y-junction waveguide shown in FIG. 3.

With respect to optical amplifier 310, the structure is that of a semi-insulating planar buried heterostructure (SIPBH) type, with Fe doped semi-insulating InP layers 320 used for both current blocking and transverse optical confinement therein. Optical amplifier 310 is similar to Y-junction waveguide 300 except for active InGaAsP layer 330 and p conductivity type layers 350, which facilitates electrical contact to active region 330 of optical amplifier 310. Importantly, Y-junction region 380 between the branches of the Y-junction has a gradual change in the effective refractive index along the Z-axis, as discussed abovehenrein, to reduce the effect of the wedge tip truncation seen by an optical mode propagating therein. This may be accomplished, as is the case here, by a gradual decrease in thickness of an InGaAsP region in Y-junction region 380. Semi-insulating InP 320 is also used as a top passive cladding waveguide region because it has a smaller absorption loss coefficient than p conductivity type layers 350. As an example, passive InGaAsP waveguide 340 layer and active InGaAsP layer 330 have a respective thickness of 0.35 $\mu$m and 0.9 $\mu$m. Moreover, the widths of both the active and passive waveguides outside Y-junction region 380 are 2.5 $\mu$m.

Figure 5:
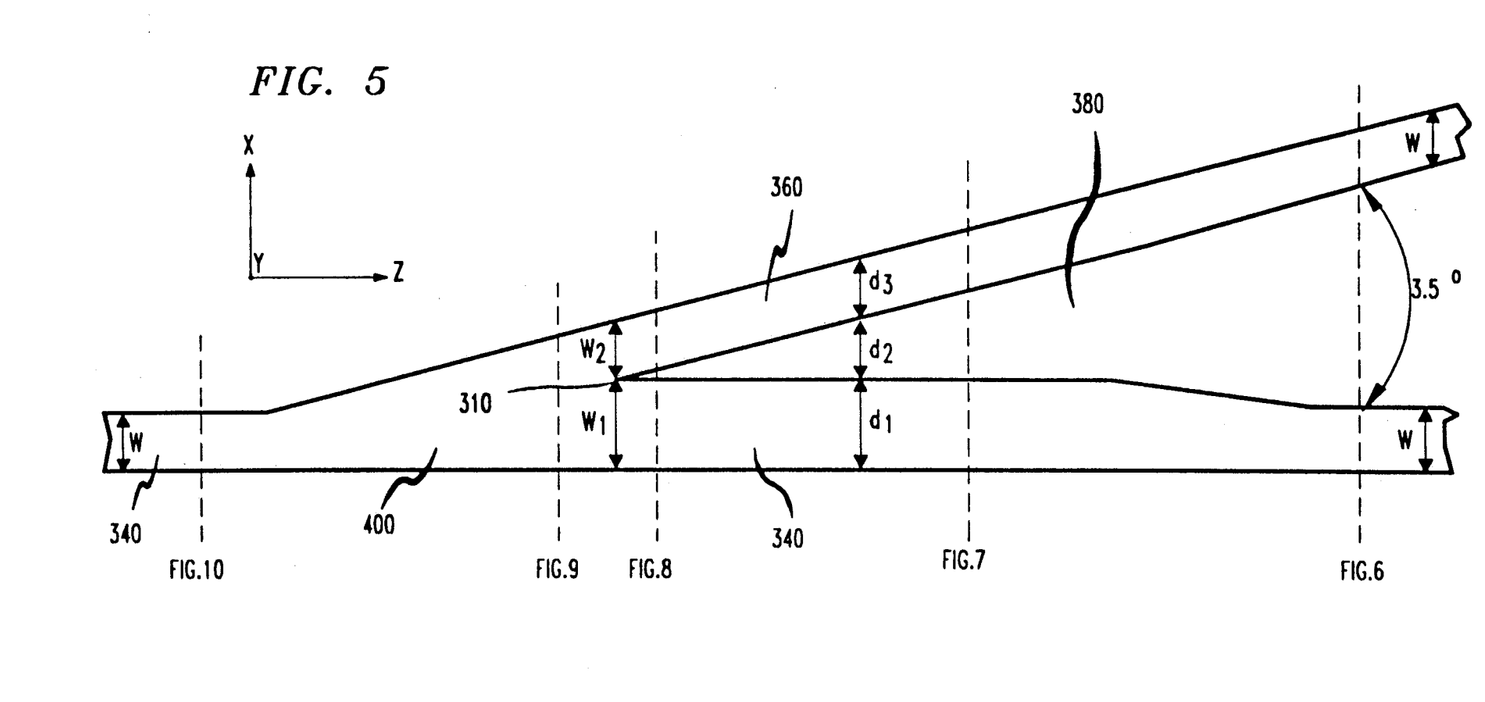
FIG. 5 shows a top plan view of the Y-junction waveguide shown in FIG. 3.
Figure 6:
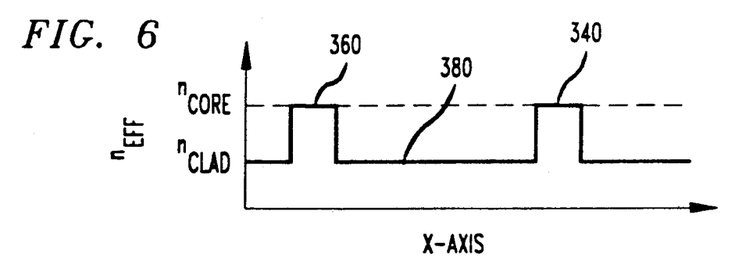
FIGS. 6, 7, 8, 9 and 10 show exemplary refractive index profiles (X-axis) of the Y-junction waveguide of FIG. 5 for various planes along the Z-axis.
Figure 7:
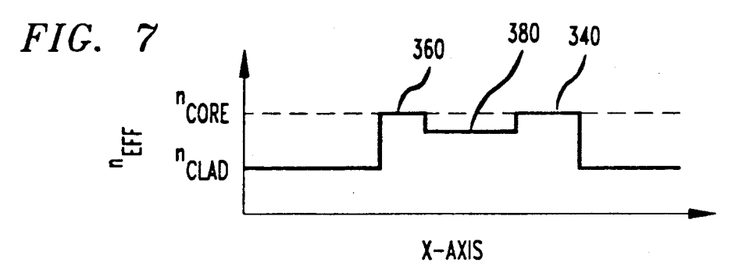
Figure 8:
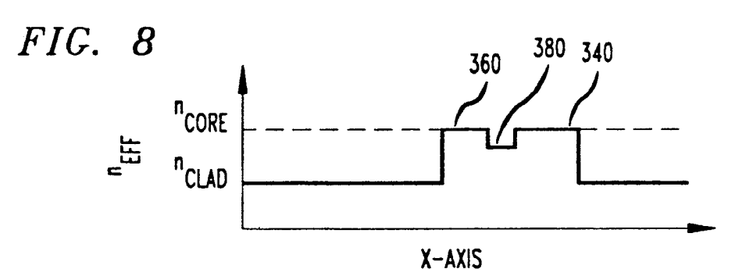
Figure 9:
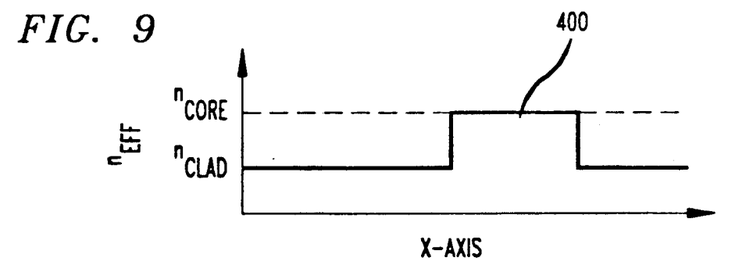
Figure 10:
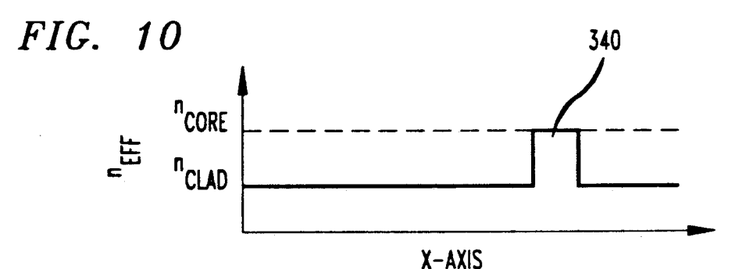

In FIG. 5, a top plan view of Y-junction waveguide 300 is illustrated. For convenience of description, the direction from straight waveguide 340 toward side waveguide 360 is taken as the Z-axis and the direction perpendicular to the plane of the drawing is taken as the Y-axis in order to define a X-Y-Z coordinate system, as shown in FIG. 5. The 2.5 μm width W of the straight branch waveguide 340 is tapered by a 80 μm tapering length for adiabatic mode propagation into Y-junction area 400. Power division occurs by mode conversion at the Y-junction, with the modal behavior dominated by the abrupt transition at the truncated wedge tip 410. The widths of the waveguides at junction tip 410 are 2.2 μm and 3.3 μm for side branch waveguide 360 and straight branch waveguide 340, respectively. Further, the width of truncated wedge tip 410 is 0.8 μm. In this exemplary structure, the widths of both waveguides are tapered back to a width W of 2.5 μm at about 100 μm outside of the Y-junction tip, as shown in FIG. 5.

The integrated structure of the optical amplifier and Y-junction waveguide comprises three epitaxial growth steps, conventional photolithography and wet chemical etching. That is, a planar metal-organic chemical vapor deposition (MOCVD) growth for InGaAsP active layer 330 and InGaAsP passive waveguide layer (core) 340, followed by two MOCVD regrowths for InP region 320 and cap layers 350. After active layer 330 and passive waveguide layer 340 are grown on n-type InP substrate 360, 2-3 μm wide mesas are etched using a SiO$_2$ mask in order to form active region 330, straight branch region 340 and side branch region 360. In particular, Y-junction waveguide mesas and the active waveguide mesa are etched using a SiO$_2$ mask with the straight sections parallel to the [011] orientation. It should be noted that passive Y-junction waveguide 300 will be similar to the active section, that is optical amplifier 310, except for active layer 330 and cap layers 350. Typically, the total height of the active waveguide mesa is 1.5-2 μm, and the height of the Y-junction mesa is less than 1 μm. Next, a MOCVD regrowth is performed for forming semi-insulating block InP region 320. The active waveguide is also completely planarized with semi-insulating InP 320, while the passive Y-branch is covered thereby. The SiO$_2$ mask is removed and cap layers 350 grown by MOCVD. Cap layers 350 consist of a 1.5 μm p-InP layer followed by a 0.5 μm p$^+$ InGaAs layer.

In order to obtain the effective refractive index profile along various planes of the Y-junction waveguide as shown in FIGS. 6 through 10 for Y-junction region 380, the processing steps are different than conventional photolithographic steps. The passive InGaAsP between the side branch waveguide 360 and straight branch waveguide 340 is only partially removed by a shallow etch when defining the waveguide mesas 340 and 360 as discussed above. With the side and straight branch waveguides defined by silicon dioxide mask and the shallow etched Y-junction region covered by photoresist, a second deep etch produces the passive InGaAsP waveguide mesas. The thickness of the shallow etched InGaAsP layer which remains between the two branches is 0.2 μm and tapers to zero over a length of 100 μm from Y-junction tip 410. A regrowth of semi-insulating InP region 320 over the InGaAsP layer buries the passive waveguides, giving the effective refractive index shown in FIGS. 6 through 10. The active area is covered by a third MOCVD growth of the p-InP and p InGaAs contact layers as discussed above. These layers in the passive waveguide and Y-junction areas are subsequently removed by chemical etching. All the etching steps above are done using standard selective etchants, such as a 2:1 mixture of HCl:H$_3$PO$_4$ for InP and a 3:1:1 mixture of H$_2$SO$_4$:H$_2$O$_2$:H$_2$O for InGaAsP and InGaAs.

Those persons skilled in the art will readily note that optical amplifier 310 is formed by depositing anti-reflective coatings on the end facets. However, it is further contemplated that optical amplifier 310 may be made into a laser either by integrating a grating in order to provide distributed feedback or by utilizing the Fabry-Perot resonances from the end facets, if made to have a sufficiently high reflectivity by subsequent coating. See, for example, K.Y Liou et al., *Appl. Phys. Lett.* Vol. 54 No. 2 pp. 114-6 (1989).

Figure 11:
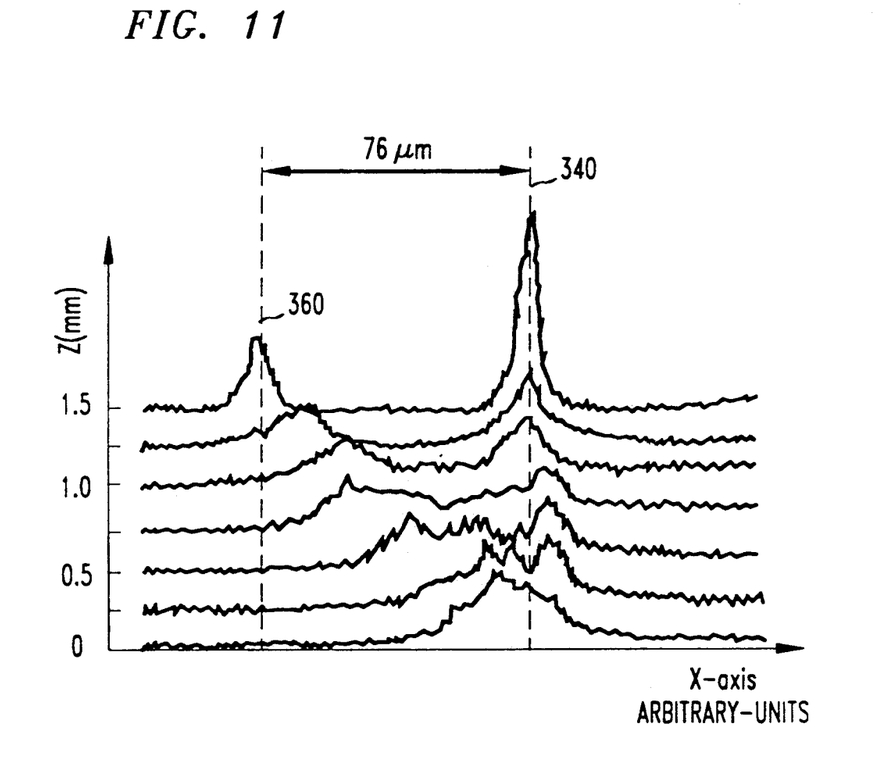
FIG. 11 shows the propagation of optical radiation in the Y-junction waveguide of FIG. 4.

In order to understand more clearly the waveguiding and power dividing properties of Y-junction waveguide 300 fabricated above, various measurements were made utilizing a vidicon infrared camera positioned perpendicular to the output facets of straight and side branch waveguides 340 and 360, respectively. In an example from experimental practice, samples of integrated chips schematically shown in FIG. 3 were cleaved from the wafer and mounted on a copper heat sink with n InP substrate 360 facing down. The total length of the Y-junction waveguide was 1600 μm, with the length of active layer 330 being 300 μm. Applying a current to active layer 330 vis-a-vis p layers 350, non-polarized, optical radiation generated by spontaneous emission was coupled into passive waveguide 340. With the vidicon infrared camera focused at various positions along the direction of straight waveguide 340 and branch waveguide 360, the light intensity profiles imaged by the camera were traced and plotted on a x-y recorder. In particular, FIG. 11 illustrates the recorded optical intensity for different planes along the waveguide in the Z-axis. For example, a fundamental mode propagating into Y-junction area 400 can be seen in the bottom trace of the figure (Z=0). It should be noted that FIG. 11 clearly shows input optical radiation being divided into two parts which evolve into two modes guided by two branching waveguides as they separate. Although the distance in the z-axis has been corrected to account for the change in refractive index from air (n~1) to the InGaAsP semiconductor (n~3.5), the x-axis has not been corrected. The top trace (Z=1.5) is the near field intensity pattern of the Y-branch output imaged in air near the output facet. Based on this intensity profile, the power splitting ratio was measured to be ~2.4:1.

To characterize the effect of polarization on the power splitting ratio, light from a DFB laser diode operating at 1.55 m was launched into active InGaAsP layer 330. Without any current injection into the active layer, the launched light was nearly completely absorbed. However, a 15 mA current was then applied to active layer 330 via p layers 350 in order to compensate for the losses. It is assumed that the spontaneous emission is negligible compared to the light signal from the external DFB laser. With the DFB laser rotated to have either TE or TM polarized light, the near field patterns for each case was photographed and traced. In each case, measurements indicate that the power splitting ratio remains the same at ~2.4:1.

Further experimental measurements indicate that the radiative loss is approximately 8.3% whereas the power reflection from the Y-junction is $5 \times 10^{31}$ [7]. The small reflectivity is simply due to the small change in the effective refractive indices at the truncated wedge tip.

Apposite to understanding and calculating the optical losses and waveguiding characteristics of the inventive Y-junction waveguide, is the development of a theoretical framework by which to define various parameters effecting the power transmission, power splitting ratio, radiative loss and back-reflectivity. Although the properties of branching waveguides have been analyzed previously, the proceeding theoretical analysis accounts for the inventive waveguide structure near the truncated Y-junction wedge tip. For a general discussion on mode conversion in branching waveguides, see Burns et al., *IEEE Journal of Quantum Electronics*, Vol. QE-11pp. 32-9 (1975). It can be shown that power division occurs by mode conversion at Y-junction area 400, with the modal behavior dominated by the abrupt transition at Y-junction tip 410. A expressed assumption made in the following analysis, however, is that waveguide tapering before and after Y-junction area 400 is adiabatic. Waveguide tapers have been treated by D. Marcuse in the article entiled "Radiation Losses of Tapered Dielectric Slab Waveguides", *Bell System Technical Journal*, Vol. 49 pp. 273-90 (1970). Specifically, Marcuse shows that power transfer between normal modes of the waveguide is negligible if the tapering length is sufficiently long.

Figure 12:
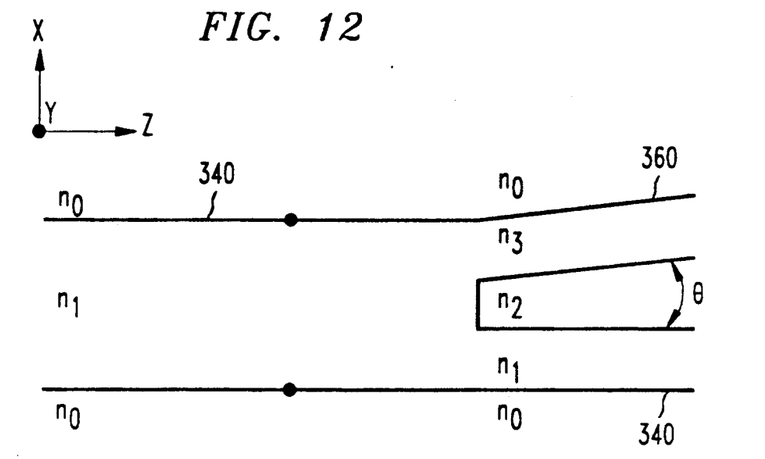
FIGS. 12 and 13 show schematic waveguide structures useful in calculating the optical characteristics of the Y-junction waveguide with respect to various optical parameters.
Figure 13:
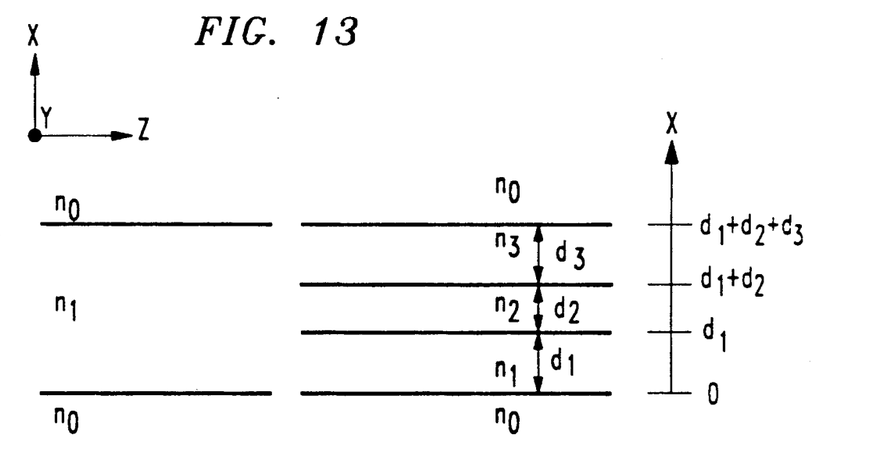

In order to compute the mode coupling at Y-junction area 400, the optical fields of the waveguide modes must be calculated. Employing the effective index method, the lateral and transverse profiles of the optical fields are calculated separately by applying a separation of variables to the wave equations. For a discussion on the effective index method, see for example, W. Streifer et al., *Appl. Optics* Vol. 18 pp. 3724-5, 1979. The waveguide structure in the y-axis for straight branch waveguide 340 is a simple three layers symmetrical waveguide: a thin InGaAsP waveguide layer 340 between an InP substrate 360 and InP region 320. Accordingly, the effective refractive index may be readily obtained by solving the three-layer wave equations. Furthermore, it can be shown that the equivalent structure of the Y-junction waveguide, as illustrated in FIG. 12, can be reduced to the coupling of optical radiation from a three layer waveguide structure to an asymmetric five layer waveguide structure, as shown in FIG. 13, by using the effective refractive indices $n_1$, $n_2$ and $n_3$ for the three regions of thickness $d_1$, $d_2$ and $d_3$, respectively. It should be noted that the index $n_o$ is the index for InP regions 360 and 320 at the wavelength of 1.55 μm. Additionally, the angle $\theta$ can be treated by later adding a phase shift factor to the field solution of the parallel waveguide structure of FIG. 13.

Employing the above formalism, for the case of TE polarization, we obtain the following expressions for the amplitude of the electric field $E_y(x)$ in different regions of the five-layer waveguide structure in FIG. 13.

$$E_y(x) = Ee^{\gamma_o x}, \text{ for } x \leq 0 \quad (1)$$

$$E_y(x) = E\left[\cos(\kappa_1 x) + \left(\frac{\gamma_o}{\kappa_1}\right)\sin(\kappa_1 x)\right] \text{ for } 0 \leq x \leq d_1 \quad (2)$$

$$E_y(x) = E\cosh[\gamma_2(x - d_1)]\left[\cos(\kappa_1 d_1) + \left(\frac{\gamma_o}{\kappa_1}\right)\sin(\kappa_1 d_1)\right] - E\left(\frac{\kappa_1}{\gamma_2}\right)\sinh[\gamma_2(x - d_1)]\left[\sin(\kappa_1 d_1) - \left(\frac{\gamma_o}{\kappa_1}\right)\cos(\kappa_1 d_1)\right] \text{ for }$$

$$d_1 \leq x \leq d_1 + d_2$$

$$E_y(x) = \cos[\kappa_3(x - d_1 - d_2)] \cdot E_y(d_1 + d_2) - \quad (4)$$

$$E\sin[\kappa_3(x - d_1 - d_2)] \cdot \left\{\left(\frac{\gamma_2}{\kappa_3}\right)\sinh[\gamma_2(x - d_1)] \cdot \left[\cos(\kappa_1 d_1) + \left(\frac{\gamma_o}{\kappa_1}\right)\sin(\kappa_1 d_1)\right] - \left(\frac{\kappa_1}{\kappa_3}\right)\cosh[\gamma_2(x - d_1)] \cdot \left[\sin(\kappa_1 d_1) - \left(\frac{\gamma_o}{\kappa_1}\right)\cos(\kappa_1 d_1)\right]\right\} \text{ for }$$

$$d_1 + d_2 \leq x \leq d_1 + d_2 + d_3$$

$$E_y(x) = E_y(d_1 + d_2 + d_3)e^{-\gamma_o(x - d_1 - d_2 - d_3)} \text{ for } d_1 + d_2 + d_3 \leq x \quad (5)$$

where $E_y(d_1+d_2)$ in Eq. (4) is from Eq. (3) with $x = d_1 + d_2$ and $E_y(d_1+d_2+d_3)$ in Eq. (5) is from Eq. (4) with $x = d_1 + d_2 + d_3$. Of course, the magnetic field $H_z$ for the five-layer waveguide structure is given by $$H_z(x) = \frac{j}{\omega\mu_o} \frac{\partial E_y(x)}{\partial x} \quad (6)$$

In Eq. (1) to Eq. (5), $K_i(i=1,3)$ and $\gamma_i(i=0,2)$ are the sinusoidal wave vectors and the exponential decay constants, respectively. They are related to the propagation constant $\beta$ by $$\beta^2 = k_o^2 n_i^2 + \gamma_i^2, \, i = 0,2 \quad (7)$$

$$\beta^2 = k_o^2 n_i^2 - \kappa_i^2, \, i = 1,3 \quad (8)$$

where $n_1$, $n_2$, and $n_3$ are the effective indices of the $d_1$, $d_2$, and $d_3$ layer, respectively; $n_0$ is the refractive index of InP, and $k_o$ is the free space wave vector.

The normal modes for the five-layer waveguide, or the "allowed" values of $\beta$, are determined by solving the eigenvalue equation which is obtained by applying the boundary conditions to the field expressions; i.e., $E_y$ and $H_z$ are continuous at layer interfaces. The mode effective index $n_{eff}$ of the five-layer waveguide is then given by:

$$n_{eff} = \beta/k_o \quad (9)$$

We note that the fields solutions in Eqs. (1) to (5) are for the case where $$n_{eff} < n_1, n_3 \text{ and } n_{eff} > n_0, n_2 \quad (10)$$

The $n_{eff} < n_2$ case gives the higher order modes which can be neglected as will be shown later.

The quantity E in Eq. (1) to Eq. (5) is a normalization constant given by $$P = \frac{\beta}{2\omega\mu_o} \int_{-\infty}^{\infty} |E_y(x)|^2 dx \quad (11)$$

where P is the optical power of the waveguide mode and set to 1 for simplicity in this calculation.

As noted abovehereinafter, straight branch waveguide 340 is a symmetrical three-layer structure, as shown in FIGS. 12 and 13. The electric field can be calculated from Eq. (1) to Eq. (5) by simply setting $d_2=0$ and $d_3=0$. At Y-junction tip 410 we found that this three layer waveguide is a multimode guide. However, the mode propagating in the waveguide remains as the fundamental mode with the assumption that tapering from the input single mode guide to a multimode guide near the Y-junction area is adiabatic.

For TM modes, the expressions of the magnetic field components $H_y(x)$ are the same as the expressions for $E_y(x)$ in Eq. (1) to Eq. (5) with $\kappa_1$, $\kappa_3$, $\gamma_0$, and $\gamma_2$ replaced by $(-\kappa_1/n_1^2)$, $(-\kappa_3/n_3^2)$, $(-\gamma_0/n_0^2)$, and $(-\gamma_2/n_2^2)$, respectively. However, the phase factors of the types $\kappa_i x$ and $\gamma_i x$ in all the trigonometric, hyperbolic and exponential functions remain unchanged. The effective indices of the TM modes are similarly determined from the corresponding eigenvalue equation derived from the boundary conditions.

We note that for a buried semiconductor waveguide, TE polarization is conventionally defined as the electric field being parallel to the interface of the thin waveguide layer and the substrate. For example, the electric field of a TE mode for the waveguide in FIG. 13 is parallel to the interface of InGaAsP layer 340 ($\lambda = 1.3$ μm) and n-InP substrate 360, and is perpendicular to the axial direction of the waveguide. With this convention, it is important to note that a TE mode for the three dimensional buried waveguide corresponds to TM polarization for the one-dimensional waveguide structures in FIGS. 12 and 13. The optical fields for TE modes are therefore obtained by calculating the TM fields of the lateral five-layer waveguide using TE effective indices $n_1$, $n_2$ and $n_3$ of the transverse three-layer guide.

Figure 14:
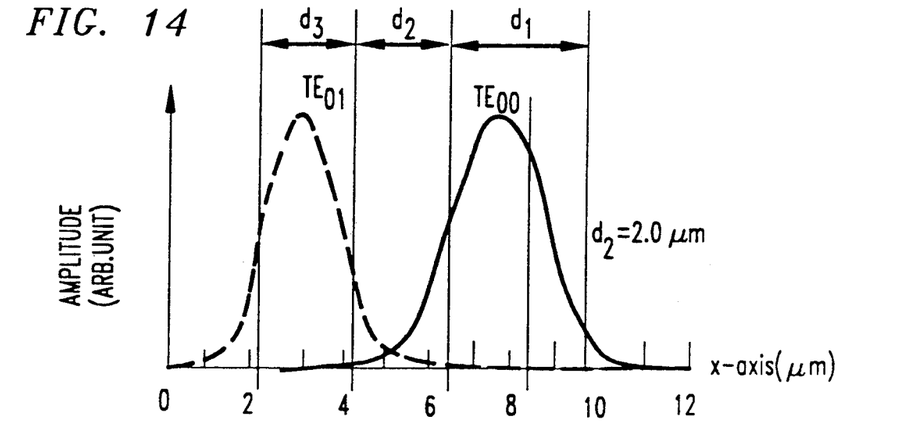
FIGS. 14, 15, and 16 show calculated optical field amplitudes for optical modes propagating in the Y-junction waveguide of FIG. 13.
Figure 15:
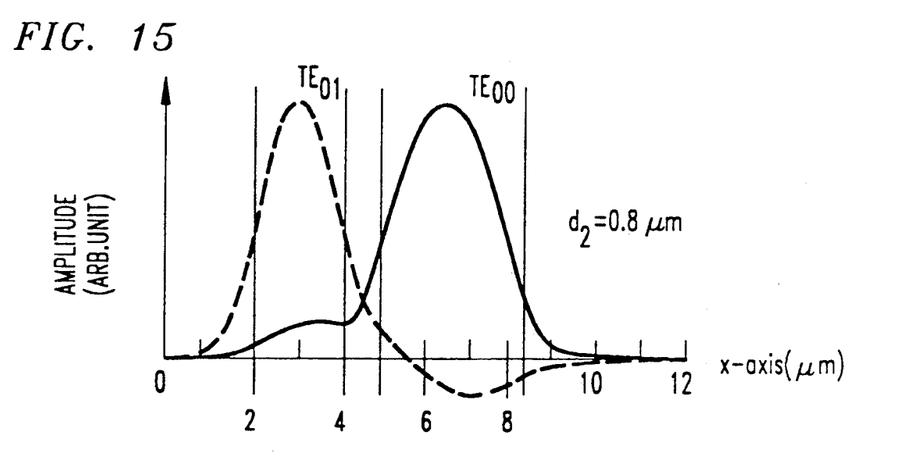
Figure 16:
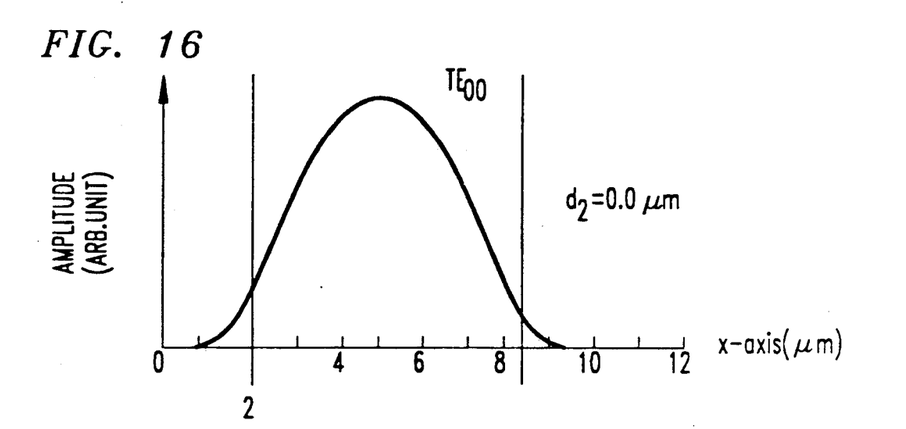

FIGS. 14, 15 and 16 show the calculated optical field amplitudes of the two lowest order modes $TE_{00}$ and $TE_{01}$ of the Y-branch as the two coupled waveguides separate. Only the fundamental $TE_{00}$ mode is shown in the input single waveguide section. We note that $TE_{00}$ mode becomes guided by straight branch waveguide 340 while the $TE_{01}$ mode shifts to the side branch waveguide 360 as the separation between the two guide increases. With our waveguide structure, the higher order modes have a much smaller coupling coefficient to the input waveguide than the $TE_{00}$ and $TE_{01}$ modes shown in FIGS. 14 through 16. In addition, the higher order modes radiate as the two Y branches separate, where the thickness of the InGaAsP layer in the region between the two guides reduces to zero.

Power conversion at the Y-junction can then be calculated by computing the coupling coefficients between the $TE_{00}$ incident mode and the $TE_{00}$ and $TE_{01}$ transmitted modes. The coupling coefficients can be calculated by considering the Y-junction as an abrupt transition at the Y-junction tip. This is similar to the approach of the prior art for a stepped discontinuity in a single mode waveguide. The coupling coefficients are derived using the orthogonal relationships of the normal modes and the boundary condition in which the transverse field components are continuous at the Y-junction tip, where the single waveguide is butt coupled to the Y branches $d_1$ and $d_3$ with the truncation $d_2$. For our multimoded case, we obtain the transmission coefficients $t_m$ $$t_m = \frac{2\sqrt{\beta^{(i)}\beta_m^{(t)}}}{\beta^{(i)} + \beta_m^{(t)}} \frac{\int_{-\infty}^{\infty} E^{(i)} E_m^{(t)*} dx}{\left[\int_{-\infty}^{\infty} |E^{(i)}|^2 dx \cdot \int_{-\infty}^{\infty} |E_m^{(t)}|^2 dx\right]^{\frac{1}{2}}} \quad (12)$$

where the mode number $m = 0,1$ are for the two lowest order transmitted modes. The superscript (i) represents the incident mode and (t) represents the transmitted mode. The function $E(x)^*$ is the complex conjugate of $E(x)$. The reflection coefficient, r is given by $$r = \frac{1}{2\left[\int_{-\infty}^{\infty} |E^{(i)}|^2 dx\right]^{\frac{1}{2}}} \sum_m \frac{t_m(\beta^{(i)} - \beta_m^{(t)})}{\sqrt{\beta^{(i)}\beta_m^{(t)}}} \quad (13)$$

$$\frac{\int_{-\infty}^{\infty} E_m^{(t)} E^{(i)*} dx}{\left[\int_{-\infty}^{\infty} |E_m^{(t)}|^2 dx\right]^{\frac{1}{2}}}$$

In Eq. (12) and Eq. (13) the mode propagating in side branch waveguide 360 with an angle $\theta$ is obtained by replacing $E_1^{(t)}$ with $$E_1^{(t)} e^{-j\beta(x-d_1-d_2-\frac{d_3}{2})\sin\theta}.$$

For our case, the power transmission to the straight branch waveguide 340 is then given by $|t_0|^2$ and the transmission to the side branch waveguide 360 by $|t_1|^2$. The power reflectivity is given by $|r|^2$. The radiation loss, L at the Y-junction can then be calculated by $$L = 1 - \sum_m |t_m|^2 - |r|^2 \quad (14)$$

For TE polarization, the calculated power transmission is 0.638 for the straight branch and 0.276 for the bend branch at a 3.5° angle. The power splitting ratio is 2.32:1. The calculated power reflectivity from the Y-junction is $5.2 \times 10^{-7}$. The radiation loss is 0.0863. For TM polarization, the calculated power splitting ratio is 2.30:1 and the power reflectivity is $5.1 \times 10^{-7}$. We found that the difference in the power splitting ratios for TE and TM polarization is smaller than 1%. The measured value 2.4:1 agrees well with calculated value of 2.3:1.

The same mathematical expressions (equations 1 through 14) can be used for designing Y-junction waveguide with power dividing ratios other than the illustrative embodiment described hereinabove.

We claim:
1. An optional branching waveguide comprising:
   a first waveguide;
   a second waveguide intersecting and coupled optically to said first waveguide to form a Y-junction having a truncated wedge tip, said Y-junction having a junction region located between said first and second waveguides, and a gradient in the effective refractive index coupled to said junction region along the axis of optical propagation of said first waveguide so as to reduce the difference between the effective refractive indices at the optical interface of said truncated wedge tip for reducing back reflection of optical radiation incident on said truncated wedge tip.

2. The optical branching waveguide as defined in claim 1 wherein said gradient in effective refractive index varies from the core refractive index to the cladding refractive index of said first waveguide.

3. The optical branching waveguide as defined in claim 2 wherein said gradient in the effective refractive index further comprises a first semiconductor material having a gradual decrease in thickness and a second semiconductor material disposed over said first semiconductor material, said first semiconductor material having a refractive index higher than the refractive index of said second semiconductor material.

4. The optical branching waveguide as defined in claim 3 wherein said first and second waveguides are planar waveguides.

5. The optical branching waveguide as defined in claim 4 wherein said first and second waveguides are integrated on a semiconductor substrate.

6. The optical branching waveguide as defined in claim 5 wherein said semiconductor substrate comprises InP.

7. The optical branching waveguide as defined in claim 6 wherein said first and second waveguides comprise InGaAsP.

8. The optical branching waveguide as defined in claim 7 wherein said first and second semiconductor materials comprise InGaAsP and InP, respectively.

9. The optical branching waveguide as defined in claim 8 wherein said InGaAsP material has a bandgap energy corresponding to a waveguide of 1.3 μm.

10. The optical branching waveguide as defined in claim 9 wherein said InP material is semi-insulating.

11. The optical branching waveguide as defined in claim 10 wherein said first waveguide intersects said second waveguide at an angle of less than 5°.

12. The optical branching waveguide as defined in claim 11 wherein said first and second waveguides are single mode waveguides.

13. The optical branching waveguide as defined in claim 12 wherein said first and second waveguides are tapered for adiabatic mode propagation for a region located away from said truncated wedge tip.

14. A device comprising an optical amplifier and a branching waveguide, said optical amplifier being optically coupled to said branching waveguide, said branching waveguide comprising:
 a first waveguide;
 a second waveguide intersecting and coupled optically to said first waveguide to form a Y-junction having a truncated wedge tip, said Y-junction having a junction region located between said first and second waveguides, and (means) a gradient in the effective refractive index coupled to said junction region along the axis of optical propagation of said first waveguide so as to reduce the difference between the effective refractive indices at the optical interface of said truncated wedge tip for reducing the back-reflection of optical radiation incident on said truncated wedge tip from optical amplifier.

15. The device as defined in claim 14 wherein said gradient in effective refractive index varies from the core refractive index to the cladding refractive index of said first waveguide.

16. The device as defined in claim 15 wherein said gradient in the effective refractive index further comprises a first semiconductor material having a gradual decrease in thickness, and a second semiconductor material disposed over said first semiconductor material, said first semiconductor material having a refractive index higher than the refractive index of said second semiconductor material.

17. The device as defined in claim 16 wherein said first and second waveguides are planar waveguides.

18. The device as defined in claim 17 wherein said first and second waveguides and said optical amplifier are integrated on a semiconductor substrate.

19. The device as defined in claim 18 wherein said optical amplifier further comprises an active semiconductor layer.

20. The device as defined in claim 19 wherein a portion of said first waveguide is disposed underneath said active semiconductor layer so that optical radiation from said optical amplifier is optically coupled to said first waveguide.

21. The device as defined in claim 20 wherein said semiconductor substrate comprises InP.

22. The device as defined in claim 21 wherein said first and second waveguide, and said active semiconductor layer comprise passive and active InGaAsP materials, respectively.

23. The device as defined in claim 22 wherein said passive InGaAsP material has a bandgap energy corresponding to a wavelength of 1.3 μm.

24. The device as defined in claim 23 wherein said active InGaAsP material has a bandgap energy corresponding to a wavelength of 1.55 μm.

25. The device as defined in claim 24 wherein said first and second semiconductor materials comprise InGaAsP and InP, respectively.

26. The device as defined in claim 25 wherein said InP material is semi-insulating.

27. The device as defined in claim 26 wherein said first waveguide intersects said second waveguide at an angle of less than 5°.

28. The device as defined in claim 27 wherein said first and second waveguides are single mode waveguides.

29. The device as defined in claim 28 wherein said first and second waveguides are tapered for adiabatic mode propagation for a region located away from said truncated wedge tip.

* * * * *